(12) United States Patent
Chiabrera

(10) Patent No.: US 8,553,785 B2
(45) Date of Patent: Oct. 8, 2013

(54) APPARATUS AND METHOD FOR TRANSMITTING AND RECOVERING ENCODED DATA STREAMS ACROSS PHYSICAL MEDIUM ATTACHMENTS

(75) Inventor: Michele Chiabrera, Pavia (IT)

(73) Assignee: STMicroelectronics, Inc., Coppell, TX (US)

(*) Notice: Subject to any disclaimer, the term of this patent is extended or adjusted under 35 U.S.C. 154(b) by 720 days.

(21) Appl. No.: 12/627,687

(22) Filed: Nov. 30, 2009

(65) Prior Publication Data

US 2010/0202556 A1    Aug. 12, 2010

Related U.S. Application Data

(60) Provisional application No. 61/204,095, filed on Dec. 31, 2008.

(51) Int. Cl.
*H04B 14/04* (2006.01)
(52) U.S. Cl.
USPC .......................................... 375/253; 375/242
(58) Field of Classification Search
USPC ............ 375/240, 240.24, 241, 242, 246, 253; 348/420.1, 422.1, 423.1; 704/500, 501
See application file for complete search history.

(56) References Cited

U.S. PATENT DOCUMENTS

| 7,251,699 | B1* | 7/2007 | Lo ................................. | 709/250 |
| 2006/0041817 | A1* | 2/2006 | Raahemi ....................... | 714/752 |
| 2007/0157060 | A1* | 7/2007 | Ganga et al. .................. | 714/752 |
| 2007/0160302 | A1* | 7/2007 | Han et al. ...................... | 382/240 |
| 2007/0234172 | A1* | 10/2007 | Chiabrera ..................... | 714/752 |
| 2007/0263533 | A1* | 11/2007 | Chiabrera ..................... | 370/229 |
| 2008/0065965 | A1* | 3/2008 | Hannuksela .................. | 714/776 |
| 2009/0257445 | A1* | 10/2009 | Chan et al. .................... | 370/463 |
| 2009/0279548 | A1* | 11/2009 | Davis et al. ................... | 370/394 |
| 2010/0246825 | A1* | 9/2010 | Baras et al. ................... | 380/270 |

* cited by examiner

*Primary Examiner* — Young T. Tse
(74) *Attorney, Agent, or Firm* — Munck Wilson Mandala, LLP

(57) ABSTRACT

An apparatus and method for transmitting and recovering encoded data streams across Physical Medium Attachments (PMA) are provided. The data stream includes a plurality of data blocks. The method of transmitting includes tagging at least some of the plurality of data blocks in the data stream. The method also includes splitting the data stream into first and second lanes of data blocks. The method further includes transmitting the first lane of data blocks to a first PMA and the second lane of data blocks to a second PMA.

24 Claims, 5 Drawing Sheets

APPARATUS AND METHOD FOR TRANSMITTING AND RECOVERING ENCODED DATA STREAMS ACROSS PHYSICAL MEDIUM ATTACHMENTS

CROSS-REFERENCE TO RELATED APPLICATION(S) AND CLAIM OF PRIORITY

The present application is related to U.S. Provisional Patent Application No. 61/204,095, filed Dec. 31, 2008, entitled "APPARATUS AND METHOD FOR TRANSMITTING AND RECOVERING ENCODED DATA STREAMS ACROSS PHYSICAL MEDIUM ATTACHMENTS". Provisional Patent Application No. 61/204,095 is assigned to the assignee of the present application and is hereby incorporated by reference into the present application as if fully set forth herein. The present application hereby claims priority under 35 U.S.C. §119(e) to U.S. Provisional Patent Application No. 61/204,095.

TECHNICAL FIELD

This disclosure is generally directed to communication networks and more specifically to an apparatus and method for transmitting and recovering encoded data streams across physical medium attachments.

BACKGROUND

The communication of data over communication networks often involves encoding and decoding the data. Many different coding schemes have been developed for use in encoding and decoding data. One conventional coding scheme is 64B/66B coding, which is defined in the IEEE 802.3 standard for use in networks like ten-gigabit Ethernet networks. The 64B/66B coding scheme is used for physical coding sublayer (PCS) encoding and decoding of data.

In the 64B/66B coding scheme, eight ten-gigabit media independent interface (XGMII) octets are encoded into a 66-bit encoded data block, which is transferred over a single physical medium attachment (PMA) in 16-bit transfers. Similarly, eight XGMII octets are decoded from a 66-bit encoded data block, which is received over a single physical medium attachment in 16-bit transfers. A physical medium attachment typically supports access to a physical transmission medium, such as printed circuit board (PCB) tracks or lanes. The physical medium attachment may be responsible, for example, for serializing and de-serializing data between the physical transmission medium and the physical coding sublayer.

SUMMARY

This disclosure provides an apparatus and method for transmitting and recovering encoded data streams across multiple physical medium attachments.

A method and apparatus for transmitting an encoded data stream are provided. The data stream includes a plurality of data blocks. The method includes tagging at least some of the plurality of data blocks in the data stream. The method also includes splitting the data stream into first and second lanes of data blocks. The method further includes transmitting the first lane of data blocks to a first Physical Medium Attachment (PMA) and the second lane of data blocks to a second PMA.

A method and apparatus for recovering an encoded data stream are provided. The data stream comprising a plurality of data blocks. The method includes receiving the plurality of data blocks from a first Physical Medium Attachment (PMA) via a first lane and a second PMA via a second lane, at least some of the data blocks in the first and second lanes having a tag. The method also includes deskewing the data blocks in the first and second lanes based on the tags. The method further includes removing the tag from each of the at least some blocks having a tag. The method also includes decoding each of the data blocks.

Other technical features may be readily apparent to one skilled in the art from the following figures, descriptions and claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
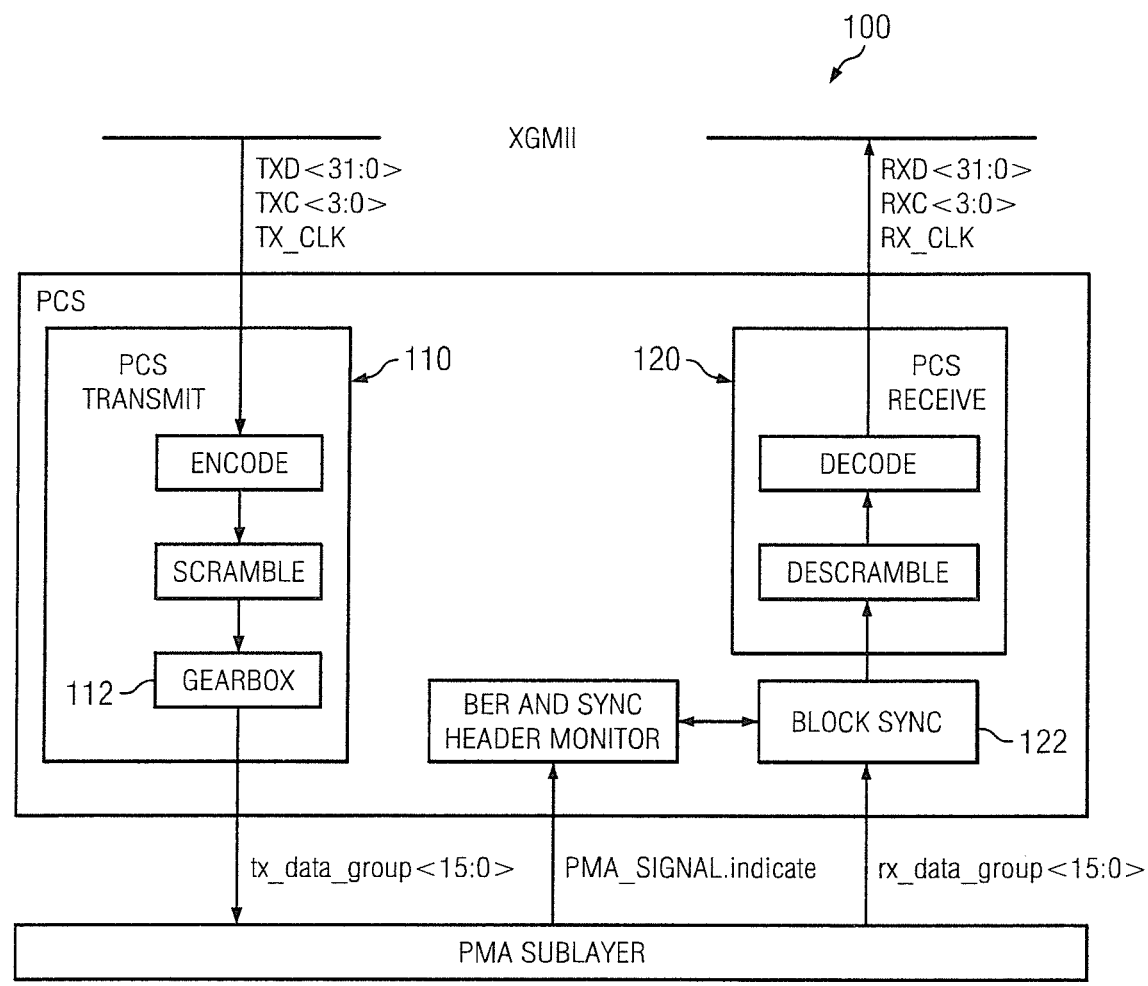
FIG. 1 depicts a block diagram illustrating a device having a transmit path and a receive path, as described in Clause 49 of the IEEE 802.3 standard.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged transmission medium.

The following standards description document is hereby incorporated into the present disclosure as if fully set forth herein:

IEEE 802.3 standard, Clauses 48 and 49.

This disclosure provides an apparatus and method for transmitting and recovering encoded data (such as 64B/66B encoded data) over multiple physical medium attachments (such as over two physical medium attachments) in multiple channels or lanes. This may enable reliable data transfers over lower performing channels or lanes.

When encoded data is transmitted over multiple physical medium attachments, it may become necessary to compensate for any misalignment between the multiple channels or lanes. This misalignment may be due to various factors or contributors. In advantageous embodiments of the present disclosure, tagging is used (such as at the block level in a transmitter) to allow a receiver to recover the original block sequence and realign the physical channels or lanes.

Clause 49 of the IEEE 802.3 standard describes the mechanics of 64B/66B data encoding and decoding to be used by a 10GBASE-R physical coding sublayer (PCS). When compared to 8B/10B coding (Clause 48 of the IEEE 802.3 standard), the 64B/66B coding scheme results in lower overhead with the same bit error rate (BER) performance. One of the limits of the approach as presented in Clause 49 of the IEEE 802.3 standard is that it uses a single serial physical medium attachment (PMA). As a result, PMA serial clocks typically run 66 times faster than the ten-gigabit media independent interface (XGMII) transmit and receive clocks. For certain applications, it may be useful to take advantage of the 64B/66B encoding properties while reducing the serial clock frequency, at the cost of increasing the number of PMAs involved.

The techniques embodied in the present disclosure spread transmitted blocks (such as 66-bit blocks) over two or more PMAs, where each PMA interfaces with the PCS through an interface (such as a 16-bit interface). These techniques also recover the transmitted blocks from the multiple PMAs. This reduces the serial clock frequency by at least a factor of two, which may offer a simpler architecture that may be used, for example, in a backplane or other applications. This also takes advantage of the efficiency of the 64B/66B coding scheme while transmitting at lower clock frequencies. Furthermore, the techniques disclosed herein allow maintaining the same line coding properties of the scrambling system used in the IEEE 802.3 standard implementation (as per Clause 49.2.6) on the physical channel. Finally, the techniques disclosed herein provide a tagging system to help maintain alignment between the multiple channels or lanes.

The following first describes how 66-bit blocks can be tagged and spread over two PMAs in the transmit direction. Next, it is described how a 66-bit block alignment is recovered from two PMAs in the receive direction using the tags inserted by the transmitter. Note that the block sizes and the number of PMAs are for illustration only. It will be understood that other blocks sizes and numbers of PMAs may be possible.

Transmit Path

FIG. 1 depicts a block diagram illustrating a device 100 having a transmit path 110 and a receive path 120, as described in Clause 49 of the IEEE 802.3 standard. In a traditional 64B/66B scheme (as described in Clause 49), a 66-bit block is sent to a gearbox 112. The gearbox 112 adapts between (i) the 66-bit width of the blocks sent at the XGMII transmit clock rate $f_{TX\_CLK}$ and (ii) the 16-bit width of the PMA sent at a word rate of:

$$f_{PMAWORD} = \frac{f_{TX\_CLK} \times 66}{16}.$$

This is the original 64B/66B scheme where only one PMA is used.

Figure 2:
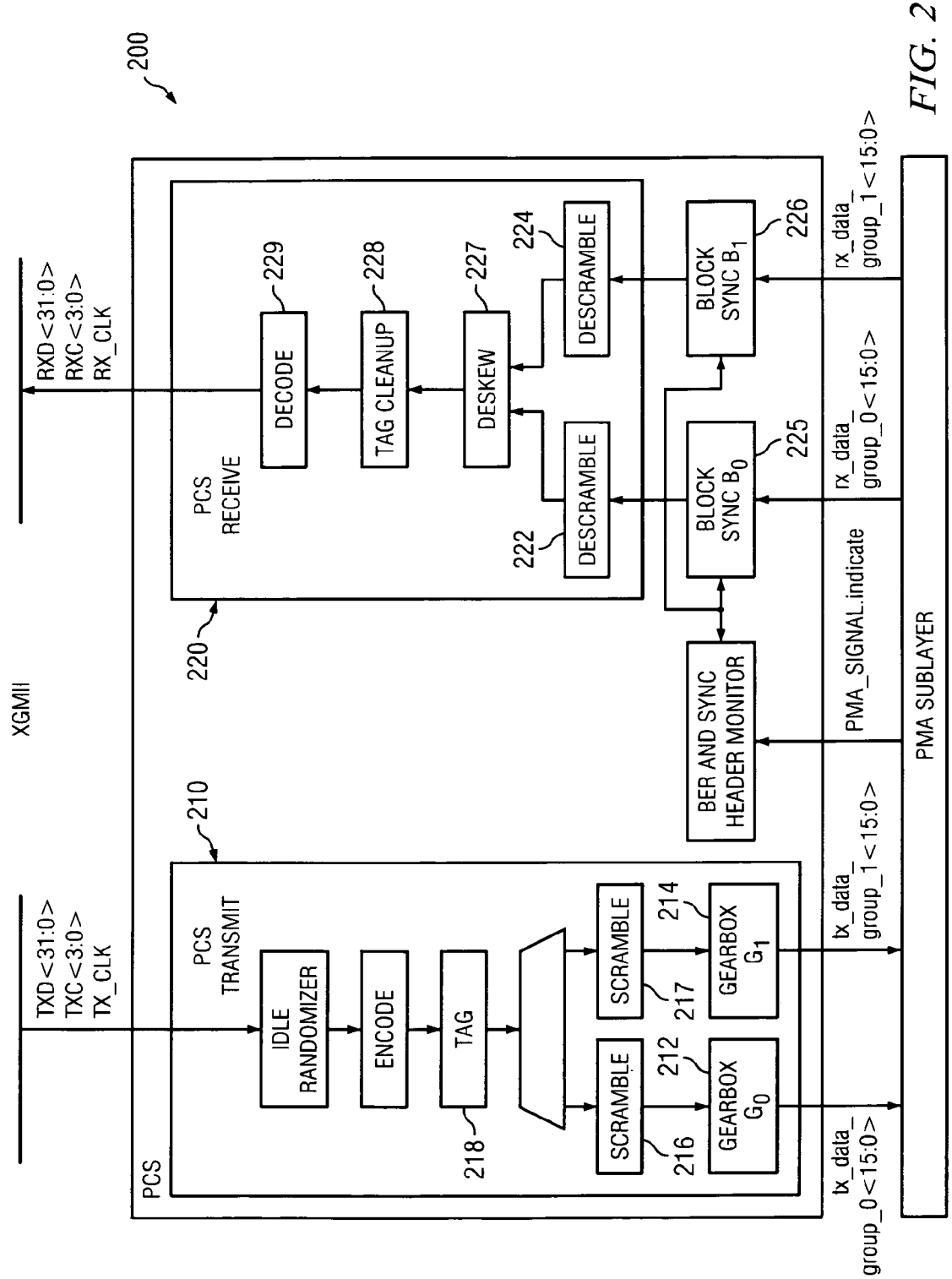
FIG. 2 depicts a block diagram illustrating a device 200 having transmit and receive paths according to embodiments of the present disclosure.

FIG. 2 depicts a block diagram illustrating a device 200 having transmit and receive paths according to embodiments of the present disclosure. Device 200 includes a transmitter module 210 and a receiver module 220. Although device 200 is depicted in FIG. 2 as one device, it is understood that device 200 may actually represent two devices, one device including the transmitter module 210, and one device including the receiver module 220. The transmitter module 210 includes two gearboxes 212 and 214, each linked to a different PMA. In certain embodiments, the path comprising each gearbox and its respective PMA may be considered a "lane". For example, lane "0" may run through the gearbox 212, and lane "1" may run through the gearbox 214. When two PMAs are used, the 66-bit blocks are divided between the two PMAs. Each PMA accepts the 16-bit words at a word rate of:

$$f_{PMAWORD} = \frac{f_{TX\_CLK} \times 66}{32}.$$

In one embodiment, a simple method to divide the blocks between the two gearboxes 212 and 214 includes one gearbox (e.g., gearbox 212) transmitting all the odd blocks and the other gearbox (e.g., gearbox 214) transmitting all the even blocks. Such a method of dividing the blocks is for example purposes only. Other methods of the dividing the blocks between the gearboxes 212 and 214 may be possible. Before the blocks are transmitted to the gearboxes 212 and 214, they are first scrambled by the scramblers 216 and 217. Descramblers 222 and 224 are used to recover lane alignment on the receiver side 220.

The technique illustrated in FIG. 2 utilizes a tagging system 218 implemented in the transmitter 210. The tagging occurs before scrambling to maintain the line coding properties of the selected scrambler on a given lane. Here, data blocks are first encoded and tagged. After that, the data blocks are split among the lanes and then scrambled in each individual lane and sent to the gearboxes. Tagging helps to ensure that the blocks are reconstructed in the correct order by the receiver 220.

Many of the components shown in FIG. 2 (such as the gearboxes, scramblers, demultiplexer, encoder, block synchronization modules, descramblers, deskew module, and decoder) are described in more detail in U.S. Patent Publication No. 2007/0234172, which is hereby incorporated by reference.

Figure 3:
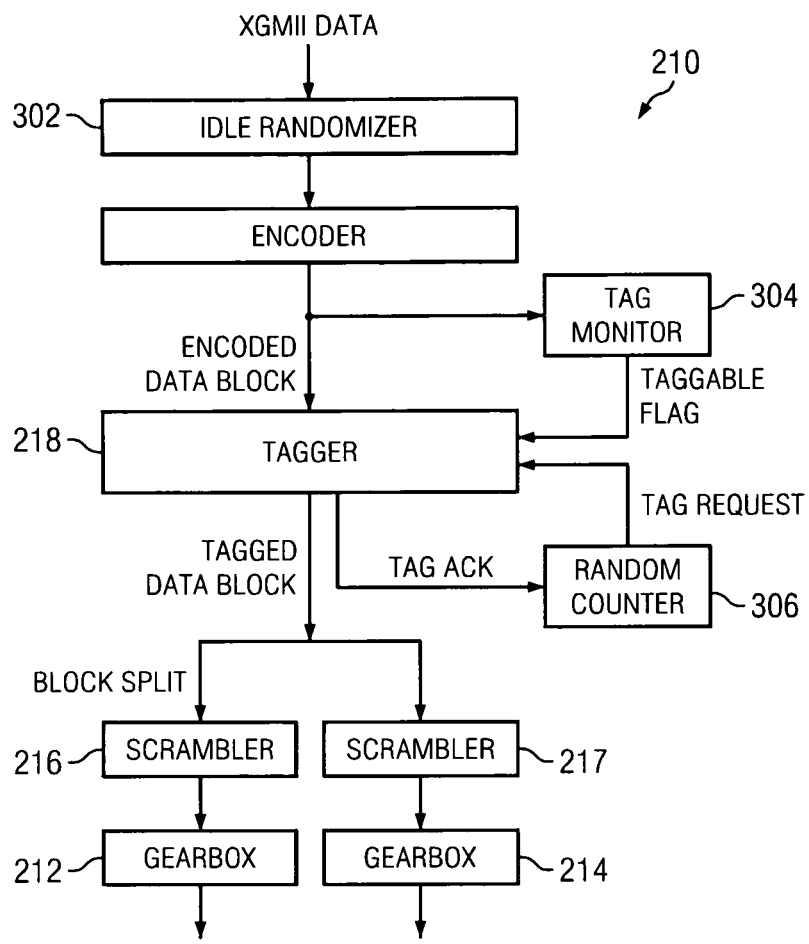
FIG. 3 depicts a block diagram illustrating a more detailed view of a transmitter module according to one embodiment of the present disclosure.

FIG. 3 depicts a block diagram illustrating a more detailed view of the transmitter module 210 according to one embodiment of the present disclosure. In addition to the elements disclosed in FIG. 2, the transmitter module 210 also includes an idle randomizer 302, a tag monitor 304, and a random counter 306. To simplify discussion, two letter codes are used herein to refer to the different control blocks from FIG. 49-7 of the IEEE 802.3 standard. These codes are summarized in Table 1 below.

TABLE 1

| Two Letter Code | Original Block Type Field (per IEEE 802.3 standard) |
| --- | --- |
| DD | Data block |
| CC | 0x1E |
| CO | 0x2D |
| CS | 0x33 |
| OS | 0x66 |
| OO | 0x55 |
| SD | 0x78 |
| OC | 0x4B |
| T0 | 0x87 |
| T1 | 0x99 |
| T2 | 0xAA |
| T3 | 0xB4 |
| T4 | 0xCC |
| T5 | 0xD2 |
| T6 | 0xE1 |
| T7 | 0xFF |

In certain embodiments, a tag is placed on two consecutive or subsequent blocks if they meet certain criteria, meaning that the blocks are considered "taggable" from a block sequence perspective. Two consecutive or subsequent blocks are chosen since it is guaranteed that one block will be sent on lane "0" and the other block sent on lane "1" given the odd block/even block split method described above. Although the disclosed embodiments describe tagging two consecutive or subsequent blocks, it is understood that, in other embodiments, more than two consecutive or subsequent blocks may be tagged.

In the transmit direction, the functional elements of the transmit path shown in FIG. 3 can be summarized as follows:

Idle randomizer 302 performs at the XGMII level before 64B/66B encoding to avoid the persistent occurrence of what is considered a "not taggable" control block (i.e., OO blocks).

Tag monitor 304 monitors any two consecutive or subsequent encoded blocks to determine if they are taggable and provides a "taggable" flag to the tagger 218. This is explained in greater detail below.

Tagger 218 substitutes some of the encoded block bits with a known pattern of bits (i.e., a tag) that is used at the receiver end to recover the lane alignment, provided that the tag monitor 304 indicates a taggable two block sequence and the random counter 306 issues a tag request. When a tag is issued, a tag acknowledgement is sent to the random counter 306.

Random counter 306 is a randomly initialized counter (e.g., counting from 16 to 31) that counts transmitted blocks and is reset whenever a tag is issued by the tagger 218. Whenever the counter 306 expires, a tag request is sent to the tagger 218.

Scramblers 216 and 217 serve to scramble the blocks in lane "0" and lane "1". All transmitted blocks are split between the two lanes and scrambled by the scramblers 216 and 217 before being serialized on each lane.

Figure 4:
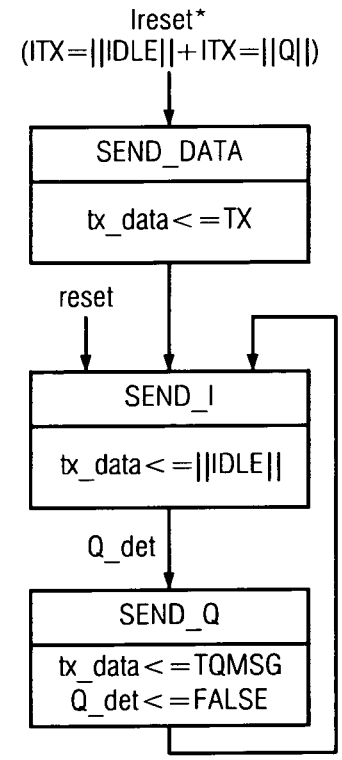
FIG. 4 depicts a finite station machine used in an idle randomizer according to one embodiment of the present disclosure.

In certain embodiments, the idle randomizer 302 is implemented using a finite state machine (FSM). One example of the finite state machine used in the idle randomizer 302 is shown in FIG. 4. In this embodiment, the idle randomizer 302 operates on a single XGMII transfer. In FIG. 4, the state machine 400 makes exactly one transition for each XGMII transfer that is processed.

Figure 6:
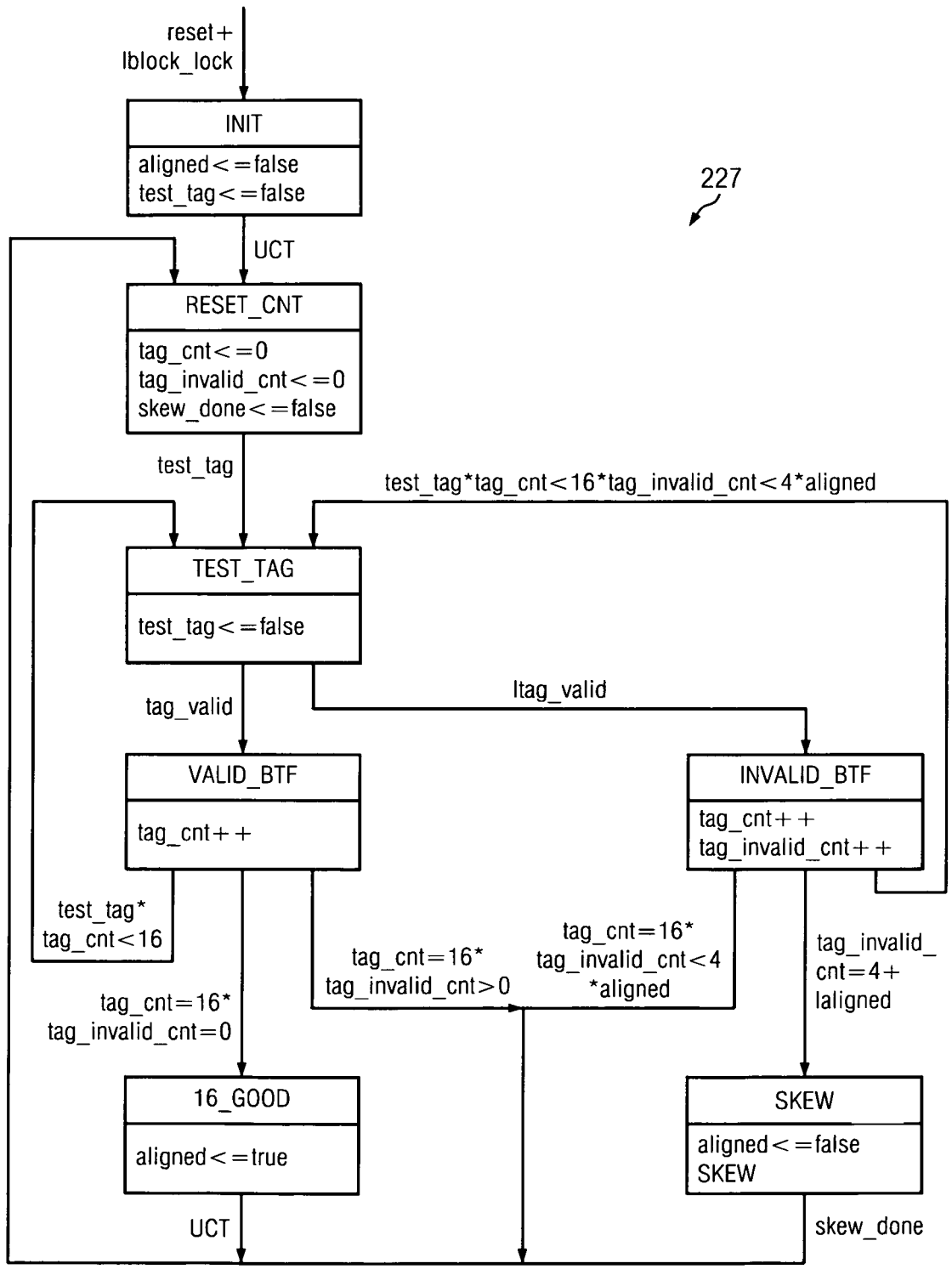
FIG. 6 depicts a finite state machine in greater detail, according to one embodiment of the present disclosure.

The state machine 400 is a simplified version of the state machine represented in FIG. 48-6 of the IEEE 802.3 standard. Here, the variables TX, reset, Q_det, TQMSG, ||Q||, and ||IDLE|| are analogous to those defined in Clause 48.2.6.1 of the IEEE 802.3 standard. One difference is that, whenever applicable, the variables refer to the 8-bit×4 lane XGMII data, as opposed to the 10-bit×4 lane encoded version of the same data. For example, the ||IDLE|| constant is a concatenation of four idle XGMII control characters, i.e. TXC=0xF, TXD=0x07070707. The tx_data variable is an alias for either (i) TXD <31:0> and TXC <3:0> representing the XGMII Transmit Data and Control signals or (ii) the Local Fault ordered_set as defined in Clause 46.3.4 when a fault condition is detected on the transmit path after being processed by the idle randomizer finite state machine.

The state machine 400 monitors the XGMII interface for the occurrence of ||Q|| ordered sets. Once an ordered set is observed, a ||Q|| request is recorded and acknowledged as soon as a SEND_Q state is reached. In cases where two consecutive ||Q|| requests are received, the first one is transmitted while in the SEND_Q state. The second ||Q|| request is transmitted when returning back to the SEND_Q state after transitioning through the SEND_I state. This ensures that no more than one consecutive ||Q|| request is transmitted on the line, thus avoiding the occurrence of the OO control block (the only control block that cannot be used for tagging purposes). The state machine 400 associated with the idle randomizer 302 also ensures that the 8-bit idle XGMII values are equal to 0x07.

The tag monitor 304 determines if two or more consecutive or subsequent blocks are to be tagged using specified criteria. In some embodiments, the tag monitor 304 determines if any two subsequent or consecutive blocks (denoted here as B1 and B2 for ease of explanation) are taggable based on the following criteria:

B1 and B2 are typically control blocks, as defined in FIG. 49-7 of the IEEE 802.3 standard. Blocks that are not control blocks are typically not taggable. OO blocks are also not taggable and should be removed by the idle randomizer 302.

B1 is a VALID_1 block and B2 is a VALID_2 block.

B1 block type field (BTF) equals T7 and B2 is a VALID_2 block.

B2 BTF equals OS or SD and B1 is a VALID_1 block.

VALID_1 blocks are defined as the following subset of control blocks: CC, CO, OC, T0, T1, T2, T3, T4, T5, and T6.

VALID_2 blocks are defined as the following subset of control blocks: CC, CO, OC, and CS.

If any control characters are present, they are all idles (8-bit value=0x07).

The tagger 218 substitutes two subsequent or consecutive control blocks with a tagged version of those blocks. Tagging may occur only when the tag monitor 304 identifies a pair of taggable blocks and the random counter 306 issues a tag request. Once tagging has occurred, a tag acknowledgement is sent to the random counter 306 in order to immediately reset the tag request (to avoid the occurrence of two consecutive tag requests).

In certain embodiments, tagging may include substituting one or multiple idle 7-bit encoded control characters (e.g., a "Cx" as represented in FIG. 49-7 of the IEEE 802.3 standard) with an idle 7-bit encoded /K/ or /R/ control character. In general, /K/ control characters are used to indicate VALID_1 blocks, while /R/ control characters are used to indicate VALID_2 blocks. This information is used at the receiver to understand which block came first and to establish proper lane alignment. Tagging can be performed after encoding in order to avoid generating invalid coded blocks. Such invalid coded blocks may cause an error condition to be transmitted unless the transmission FSM in FIG. 49-16 of the IEEE 802.3 standard is modified.

In some embodiments, tagging occurs according to the following rules. VALID_1 control blocks CC, OC, T0, T1, T2, T3, T4, T5, and T6, and VALID_2 control blocks CC and OC are tagged by substituting each of the encoded 7-bit idle control characters of the second XGMII transfer with either the /K/ or /R/ 7-bit encoded pattern. VALID_1 block CO and VALID_2 block CO are tagged by substituting each of the four control characters of the first XGMII transfer with either the /K/ or /R/ 7-bit encoded pattern. These two cases can be overwritten when a VALID_1 block is followed by an SD or OS block, or when a VALID_2 block is preceded by a T7 block. These rules are summarized in Table 2 below.

Figure 5:
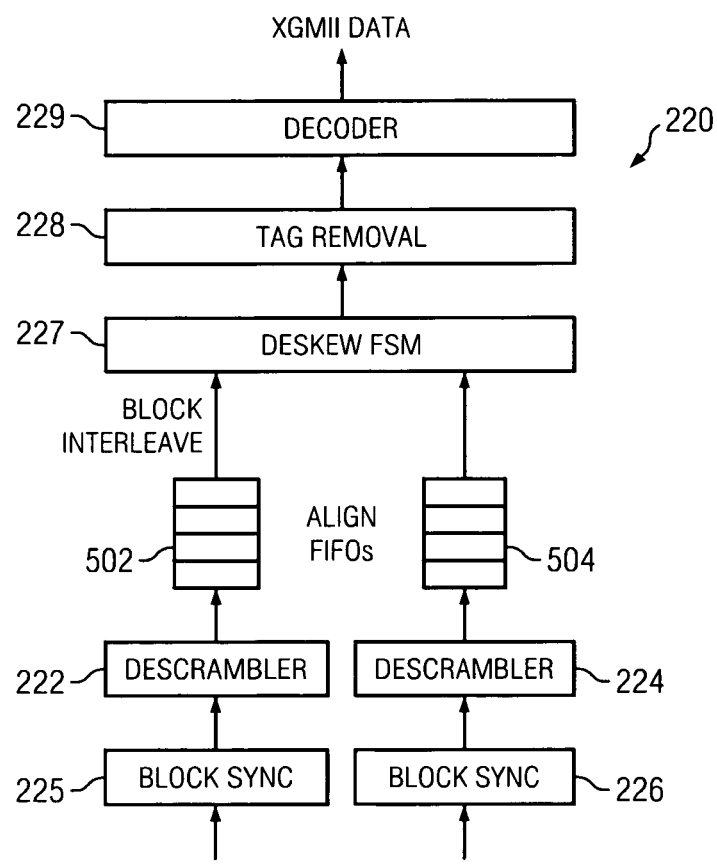
FIG. 5 depicts a block diagram illustrating a more detailed view of a receiver module according to one embodiment of the present disclosure.

FIG. 5 depicts a block diagram illustrating a more detailed view of the receiver module 220 according to one embodiment of the present disclosure. The receiver module 220 includes two block_sync modules 225 and 226, for use with two PMAs. The two block_sync modules 225 and 226 (one per PMA) each receive 16-bit words from a corresponding PMA at a rate of:

$$f_{PMAWORD} = \frac{f_{RX\_CLK} \times 66}{32}.$$

Each block_sync module 225 and 226 outputs 66-bit blocks at the XGMII receive clock rate after obtaining a lock to the 66-bit blocks in the bit stream received from its PMA using

TABLE 2

| Control Block (BTF) | Characters Replaced | VALID_1 | VALID_2 | VALID_1 + SD/OS | T7 + VALID_2 |
|---|---|---|---|---|---|
| CC, OC, T0, T1, T2, T3 | C4C5C6C7 | KKKK | RRRR (CC and OC only; T0/T1/T2/T3 cannot be VALID_2) | KKRR | RRKK (CC and OC only; T0/T1/T2/T3 cannot be VALID_2) |
| T4 | C5C6C7 | KKK | N/A | RRR | N/A |
| T5 | C6C7 | KK | N/A | RR | N/A |
| T6 | C7 | K | N/A | R | N/A |
| CO | C0C1C2C3 | KKKK | RRRR | KKRR | RRKK |

The random counter 306 is initialized to a random value whenever a tag acknowledgement is issued by the tagger 218. In some embodiments, the random value is a value between 16 and 31 randomly generated by a pseudo-random binary sequence (PRBS), based on one of the seventh-order polynomials listed in FIG. 48-5 of the IEEE 802.3 standard. On each edge of the transmit clock TX_CLK, the counter 306 counts down, and a tag request is issued whenever the counter expires.

Each scrambler 216 and 217 may be placed in, or operate in conjunction with, a gearbox (e.g., gearboxes 212 and 214). Each scrambler 216 and 217 may perform the same scrambling operations as described in Clause 49.2.6 of the IEEE 802.3 standard. However, here there are two or more scramblers per encoder, instead of a single scrambler, as described in the IEEE 802.3 standard. In certain embodiments, each scrambler 216 and 217 may scramble even or odd blocks (after the blocks are encoded, tagged, and split over the two lanes and before being sent to the gearboxes). Other methods for the division of blocks are possible.

Receive Path

A receive path 120 according to Clause 49 of the IEEE 802.3 standard is represented in FIG. 1. The block_sync module 122 receives 16-bit words from the PMA at a rate of:

$$f_{PMAWORD} = \frac{f_{RX\_CLK} \times 66}{16}.$$

Here, $f_{RX\_CLK}$ is the XGMII receive clock rate. The block_sync module 122 outputs 66-bit words at the XGMII receive clock rate after obtaining a lock to the 66-bit blocks in the bit stream using the sync headers. The lock can be obtained as specified in the block lock state machine shown in Clause 49, FIG. 49-12 of the IEEE 802.3 standard. The sync header is removed, and the remaining 64 bits are descrambled and decoded. This is the original 64B/66B scheme, where only one PMA is used.

the sync headers. The mechanism for achieving the lock may be as specified in the block lock state machine shown in Clause 49, FIG. 49-12 of the IEEE 802.3 standard.

In an ideal case where no PMA-to-PMA (i.e., lane-to-lane) skew is present in the system, recovery of the original 66-bit block is trivial. In real life applications, however, skew is typically introduced by different elements, such as printed circuit board track lengths, transmit serialization, receive deserialization, and synchronization. In one embodiment, in order to compensate for the data skew and reconstruct the correct 66-bit blocks, deskewing first in, first out (FIFO) buffers 502 and 504 are controlled by a deskewing finite state machine 227. The deskewing finite state machine 227 may monitor the received blocks and look for the tags introduced by the transmitter.

Once the deskewing finite state machine 227 has locked, the deskewing FIFOs 502 and 504 present aligned data from their outputs. Hence, the 66-bit block reconstruction can proceed by interleaving blocks alternatively from each lane. The 64B/66B deskewing finite state machine 227 is described in further detail below. The decoder 229, descrambler modules 222 and 224, and block_sync modules 225 and 226 may operate as described in Clause 49 of the IEEE 802.3 standard.

One additional process may be performed on the receive side before passing the blocks to the decoder 229. This is a tag cleanup or removal process (performed by tag remover 228) that removes the tags introduced by the transmitter, replacing the tags with the 7-bit encoded idle control character 0x00. For example, each time a tag is recognized as belonging to one of the tag possibilities listed in Table 2, all control characters that were replaced by 7-bit encoded /K/ or /R/ codes may be replaced with the 7-bit encoded idle control character 0x00.

The deskewing finite state machine 227 is responsible for realigning the data produced by each block_sync module 225, 226 in order to allow for the correct recovery of the 66-bit blocks. To achieve lane alignment, the deskewing finite state machine 227 takes, advantage of the tags introduced in the transmit direction. Each block_sync module 225, 226 receives and descrambles the 66-bit blocks, which are then interleaved and delayed to form a candidate single block sequence. The deskewing finite state machine 227 starts testing the candidate alignment configuration by monitoring for tagged control blocks. Two consecutive blocks are constantly monitored for a valid tag to appear in the first, second, or both control blocks.

When a valid tag is detected, it is compared against the allowed tag combinations shown in Table 2 above. If a tag combination is allowed, the candidate alignment configuration is possibly a valid one. If only one of the two subsequent blocks is a valid tagged block, the candidate alignment configuration is not valid and is discarded. The assumption is that whenever 66-bit control blocks originating from block_sync modules 225 and 226 are queued in the wrong order, several invalid tag sequences appear. Of course, there is always the possibility that a bit error occurred, generating an error in the finite state machine 227. The probability of making a mistake $P_{err}$ can be reduced or minimized by increasing the number M of consecutive valid tagged block pairs needed before setting the aligned flag.

In case of an error condition (e.g., a deskew error) found in an M-block window before reaching alignment, the whole deskewing process starts over, and a new candidate alignment configuration is tested. In case alignment is achieved, the deskewing process may start over if N error conditions are detected in an M-block window.

In certain embodiments, the deskewing finite state machine 227 is a variation of the lock finite state machine described in Clause 49, FIG. 49-12 in the IEEE 802.3 standard. FIG. 6 depicts the finite state machine 227 in greater detail, according to one embodiment of the present disclosure. In this embodiment, the deskewing finite state machine 227 is represented with M=16 and N=4. The following variables are used in the finite state machine 227 shown in FIG. 6:

- block_lock: Boolean variable that is set to true when both block_sync modules 225 and 226 acquire block delineation.
- reset: Boolean variable that controls the resetting of the 64B/66B PCS. It is true whenever the FSM reset input is set to 1, which is whenever a reset is necessary (including when a reset is initiated from a Management Data Input/Output (MDIO) during power on, and when the MDIO has put the PCS into low-power mode).
- tag_valid: Boolean variable that is set to true whenever the first and second blocks of a two consecutive block sequence are:
- first block=VALID_1 block tagged as shown in the third column of Table 2, and second block=VALID_2 block tagged as shown in the fourth column of Table 2.
- first block=VALID_1 block tagged as shown in the fifth column of Table 2, and second block=SD or OS block.
- first block=T7 block, and second block=VALID_2 block tagged as shown in the sixth column of Table 2.
- skew_done: Boolean variable that is asserted true when the SKEW requested by the deskew FSM 227 has been completed, indicating that the next candidate alignment setting can be tested.
- test_tag: Boolean variable that is set to true when a VALID_1 tagged block is observed as the first block of a two consecutive block sequence, or a VALID_2 tagged block is observed as the second block of a two consecutive block sequence.
- aligned: Boolean variable that is set to true when the deskew FSM 227 achieves alignment.

The SKEW function shown in FIG. 6 causes the next candidate alignment setting to be tested. The precise method for determining the next candidate alignment setting may be implementation dependent. However, an implementation may ensure that all possible candidate alignment combinations are evaluated.

The following counters are shown in FIG. 6:
- tag_cnt: Counts of the number of tagged block pairs checked within the current M tagged block pair window.
- tag_invalid_cnt: Counts of the number of invalid tagged block pairs within the current M tagged block pair.

Note that various details have been provided above describing one specific implementation of a system that utilizes multiple PMAs to transport encoded data. These details are provided for illustration and explanation of that one specific implementation. Various modifications to that specific implementation may be made according to particular needs.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of transmitting an encoded data stream, the data stream comprising a plurality of data blocks, the method comprising:
   tagging at least two of the plurality of data blocks in the data stream;
   splitting the data stream into a first lane having a first portion of the plurality of data blocks including a first one of the at least two tagged data blocks and a second lane having a second portion of the plurality of data blocks including a second one of the at least two tagged data blocks; and
   transmitting the first portion of the plurality of data blocks including the first tagged data block in the first lane to a first Physical Medium Attachment (PMA) and the second portion of the plurality of data blocks including the second tagged data block in the second lane to a second PMA.

2. The method of claim 1, the method further comprising:
   scrambling the first portion of the plurality of data blocks in the first lane and scrambling the second portion of the plurality of data blocks in the second lane.

3. The method of claim 1, wherein the plurality of data blocks comprises 66-bit blocks that are encoded using a 64B/66B coding scheme.

4. The method of claim 1, wherein the first portion of the plurality of data blocks in the first lane comprises odd blocks and the second portion of the plurality of data blocks in the second lane comprises even blocks.

5. The method of claim 1, wherein tagging comprises replacing at least some of a plurality of bits in each of the at least two of the plurality of data blocks with a known pattern of bits.

6. The method of claim 5, wherein the known pattern of bits comprises at least one of a /K/ control character and a /R/ control character, wherein the /K/ control character and the /R/ control character comprise seven-bit encoded control characters.

7. The method of claim 1, wherein the at least two tagged data blocks comprise only control blocks.

8. An apparatus for transmitting an encoded data stream, the data stream comprising a plurality of data blocks, the apparatus comprising:
- a tagger configured to tag at least two of the plurality of data blocks in the data stream;
- a demultiplexer configured to split the data stream into a first lane having a first portion of the plurality of data blocks including a first one of the at least two tagged data blocks and a second lane having a second portion of the plurality of data blocks including a second one of the at least two tagged data blocks;
- a first gearbox configured to transmit the first portion of the plurality of data blocks including the first tagged data block in the first lane to a first Physical Medium Attachment (PMA); and
- a second gearbox configured to transmit the second portion of the plurality of data blocks including the second tagged data block in the second lane to a second PMA.

9. The apparatus of claim 8, the apparatus further comprising:
- a first scrambler configured to scramble the first portion of the plurality of data blocks in the first lane; and
- a second scrambler configured to scramble the second portion of the plurality of data blocks in the second lane.

10. The apparatus of claim 8, wherein the plurality of data blocks comprises 66-bit blocks that are encoded using a 64B/66B coding scheme.

11. The apparatus of claim 8, wherein the first portion of the plurality of data blocks in the first lane comprises odd blocks and the second portion of the plurality of data blocks in the second lane comprises even blocks.

12. The apparatus of claim 8, wherein the tagger is further configured to tag the at least two of the plurality of data blocks by replacing at least some of a plurality of bits in each of the at least two of the plurality of data blocks with a known pattern of bits.

13. The apparatus of claim 12, wherein the known pattern of bits comprises at least one of a /K/ control character and a /R/ control character, wherein the /K/ control character and the /R/ control character comprise seven-bit encoded control characters.

14. The apparatus of claim 8, wherein the at least two tagged data blocks comprise only control blocks.

15. A method for recovering an encoded data stream, the data stream comprising a plurality of data blocks, the method comprising:
receiving a first portion of the plurality of data blocks from a first Physical Medium Attachment (PMA) via a first lane and a second portion of the plurality of data blocks from a second PMA via a second lane, at least one of the first portion of the plurality of data blocks having a first tag and at least one of the second portion of the plurality of data blocks having a second tag;
deskewing the first portion and the second portion of the plurality of data blocks based on the first and second tags;
removing the first tag from each of the at least one of the plurality of data blocks having the first tag and removing the second tag from each of the at least one of the plurality of data blocks having the second tag; and
decoding each of the plurality of data blocks.

16. The method of claim 15, the method further comprising:
descrambling the first portion of the plurality of data blocks and the second portion of the plurality of data blocks.

17. The method of claim 15, wherein the plurality of data blocks comprises 66-bit blocks that are encoded using a 64B/66B coding scheme.

18. The method of claim 15, wherein the first portion of the plurality of data blocks in the first lane comprises odd blocks and the second portion of the plurality of data blocks in the second lane comprises even blocks.

19. The method of claim 15, wherein removing the first and second tags comprises replacing the tags with a 7-bit encoded idle control character.

20. An apparatus for recovering an encoded data stream, the data stream comprising a plurality of data blocks, the apparatus comprising:
- a first block_sync module configured to receive a first portion of the plurality of data blocks from a first Physical Medium Attachment (PMA) via a first lane, at least one of the first portion of the plurality of data blocks having a first tag;
- a second block_sync module configured to receive a second portion of the plurality of data blocks from a second PMA via a second lane, at least one of the second portion of the plurality of data blocks having a second tag;
- a deskewer module configured to (1) receive the first portion and the second portion of the plurality of data blocks and (2) use the first and second tags to deskew the received data blocks; and
- a tag remover configured to remove the first tag from each of the at least one of the plurality of data blocks having the first tag and remove the second tag from each of the at least one of the plurality of data blocks having the second tag.

21. The apparatus of claim 20, the apparatus further comprising:
- a first descrambler configured to descramble the first portion of the plurality of data blocks; and
- a second descrambler configured to descramble the second portion of the plurality of data blocks.

22. The apparatus of claim 20, wherein the plurality of data blocks comprises 66-bit blocks that are encoded using a 64B/66B coding scheme.

23. The apparatus of claim 20, wherein the first portion of the plurality of data blocks in the first lane comprises odd blocks and the second portion of the plurality of data blocks in the second lane comprises even blocks.

24. The apparatus of claim 20, wherein the tag remover is further configured to replace the first and second tags with a 7-bit encoded idle control character.

* * * * *